United States Patent [19]

Lindner et al.

[11] Patent Number: 4,596,851
[45] Date of Patent: Jun. 24, 1986

[54] THERMOPLASTIC MOULDING COMPOSITIONS BASED ON POLYCARBONATE/GRAFT POLYMER MIXTURES

[75] Inventors: Christian Lindner; Otto Koch, both of Cologne; Hans-Jürgen Kress, Krefeld; Horst Peters, Leverkusen, all of Fed. Rep. of Germany

[73] Assignee: Bayer Aktiengesellschaft, Leverkusen, Fed. Rep. of Germany

[21] Appl. No.: 721,082

[22] Filed: Apr. 8, 1985

[30] Foreign Application Priority Data

Apr. 12, 1984 [DE] Fed. Rep. of Germany ....... 3413751

[51] Int. Cl.$^4$ ............................................. C08L 69/00
[52] U.S. Cl. ......................................... 525/67; 525/74
[58] Field of Search ........................................... 525/67

[56] References Cited

FOREIGN PATENT DOCUMENTS

| 0089042 | 9/1983 | European Pat. Off. . |
| 2019325 | 11/1971 | Fed. Rep. of Germany . |
| 2446327 | 4/1975 | Fed. Rep. of Germany . |
| 3322260A-1 | 1/1985 | Fed. Rep. of Germany ........ 525/67 |

OTHER PUBLICATIONS

Patent Abstracts of Japan, vol. 6, No. 223 (C-133) (1101), 11/9/82.
Patent Abstracts of Japan, vol. 8, No. 41 (C-211) (1478), 11/22/84.

*Primary Examiner*—Jacob Ziegler
*Attorney, Agent, or Firm*—Connolly and Hutz

[57] ABSTRACT

The present invention relates to thermoplastic moulding compositions containing thermoplastic polycarbonates, graft polymers, rubber-free copolymers and, if appropriate, copolymeric rubbers, and also, if appropriate, conventional additives, which are characterized in that the rubber-free copolymers contain internal epoxide compounds.

10 Claims, No Drawings

THERMOPLASTIC MOULDING COMPOSITIONS BASED ON POLYCARBONATE/GRAFT POLYMER MIXTURES

The present invention relates to thermoplastic moulding compositions containing:

(A) 10 to 80 parts by weight of an aromatic thermoplastic polycarbonate, (B) 10 to 60 parts by weight of a graft polymer of ethylenically unsaturated monomers grafted onto rubbers, with a rubber content of 5 to 80% by weight, based on the weight of component (B), (C) 10 to 60 parts by weight of a thermoplastic, resinous, high-molecular rubber-free copolymer, the sum of A+B+C being 100 parts by weight in each case, and, if appropriate, (D) 1 to 20 parts by weight, preferably 5 to 20 parts by weight, based in each case on the sum of A+B+C+D, which is again 100 parts by weight in each case, of an at least partially crosslinked, internal butadiene/acrylonitrile copolymer rubber in which the weight ratio of acrylonitrile to butadiene is from 15:85 to 35:65, preferably from 20:80 to 30:70, and which has a particle size of 0.05 μm to 0.3 μm, preferably of 0.08 μm to 0.2 μm, which are characterized in that component C contains 0.05 to 5% by weight, peferably 0.1 to 3% by height, based on the weight of component C, of an ethylenically unsaturated, copolymerized epoxide compound.

In the moulding compositions according to the invention, component C according to the invention can also be a mixture of two or more than two thermoplastic high-molecular copolymers of which only one contains the copolymerized epoxide compound, but the total quantity of the copolymerized epoxide compound in the mixture of component C is again 0.05 to 5% by weight, preferably 0.1 to 3% by weight, based on the weight of the mixture of component C.

In the moulding compositions according to the invention, component C according to the invention should preferably be at least one terpolymer of 1. styrene, α-methylstyrene, a halogenostyrene, a ring-substituted $C_1$-$C_5$-alkylstyrene, methyl methacrylate or mixtures thereof with
2. (meth)acrylonitrile and/or maleic anhydride and with
3. the ethylenically unsaturated epoxide compound, in which the ratio of the monomers of group 1 to those of group 2 is between 90:10 and 50:50, preferably between 80:20 and 65:35.

Component C containing epoxide groups is thus at least one terpolymer containing epoxide groups which is derived from one monomer from each of groups 1, 2 and 3. Tetrapolymers or pentapolymers containing epoxide groups, or copolymers containing epoxide groups which are derived from more than 5 monomers from groups 1, 2 and 3, are also possible.

The thermoplastic copolymers free of epoxide groups which may be mixed with the copolymer containing epoxide groups are therefore at least dipolymers of one monomer from each of groups 1 and 2, but naturally also terpolymers or epoxide-free copolymers of more than 3 monomers from groups 1 and 2.

Moreover, the moulding compositions according to the invention can contain flame retardants such as organic halogen compounds or antimony oxides, as well as pigments, lubricants, antistatic agents, plasticizers, dyestuffs and/or fillers of the type conventionally used for polycarbonate/graft polymer mixtures, in each case in the appropriate active quantity.

Mixtures of polycarbonates and graft polymers have been known and used in industry for a long time. For special applications, for example in the car industry, particularly good combinations of properties are required, i.e. a high heat distortion resistance, a high toughness, a high heat stability under the processing conditions and, in the form of injection moulding, a matt surface. Such a combination of properties could not be achieved with the polycarbonate/ABS mixtures known hitherto.

Mixtures of polycarbonates with copolymers of glycidyl (meth)acrylate and α-olefines are known which achieve an improvement in the impact strength and the critical width (cf. Sumitomo Chemical Co., Japanese Pat. No. 57/125,253 of 04.08.1982, application No. 81/12,142 of 28.01.1981).

Mixtures of ABS polymers with glycidyl methacrylate copolymers are also known which have good dimensional stability and surface appearance and good adhesion properties (cf. Sumitomo Naugatuck, Japanese Pat. No. 57/098,541 of 18.06.1982, application No. 80/174,865 of 10.12.1980).

Impact-resistant and weather-resistant rubber-modified polymers are also known which contain internal glycidyl methacrylates or glycidyl acrylates (cf. Asahi Dow, Japanese Pat. No. 74/020,628 of 25,05.1974, application No. 037,181 of 02.05.1970).

Mixtures of polycarbonates with bromine-containing graft polymers are also known which contain admixed $Sb_2O_3$ and epoxy compounds, for example an epoxidized $C_{30}$-$C_{42}$-olefine. The moulding compositions have a good flame resistance (UL-94, SE-0) and a notched impact strength of 20 kg.cm/cm$^2$, a heat distortion point of 99° C. and a gloss of 75% (cf. Daicel, Japanese Pat. No. 50/086,551 of 11.07. 1975, application No. 136,317 of 03.12.1973).

Mixtures of polycarbonates with rubber-modified copolymers and with an olefine copolymer containing epoxy groups are also known. These mixtures have improved weld line strengths (cf. European Offenlegungsschrift No. 0,089,042). Moreover there are known mixtures of polycarbonates with rubber-modified styrene-maleic anhydride-copolymers and epoxy resins and/or phenoxy resins. These mixtures have improved weld line strengths, too (cf. European Offenlegungsschrift No. 0,096,893).

In contrast, it was surprising that the moulding compositions according to the invention have new advantages compared with these known moulding compositions, such as an elevated limiting heat stability, an improved heat distortion resistance with a very good toughness, and a homogeneous matt surface quality of the mouldings produced from the moulding compositions, for example by injection moulding or extrusion processing.

Aromatic thermoplastic polycarbonates as defined under component A in terms of the invention are homopolycarbonates and copolycarbonates of the divalent structural units of the formula I

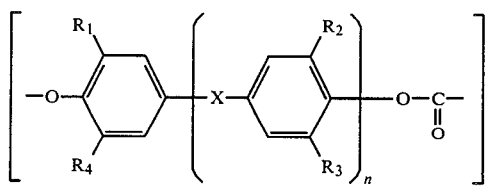

in which
R₁ to R₄ are identical or different and are H, Br or Cl,
"n" is 0 or 1 and
X is a single bond, $C_1$-$C_5$-alkylene, $C_2$-$C_5$-alkylidene, cyclohexylidene, —S—, —O—, —CO—, —SO—, —SO₂— or

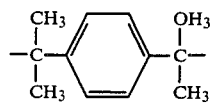

Polycarbonates of this type are known from the literature (cf., for example, H. Schnell, Chemistry and Physics of Polycarbonates, Interscience Publishers, New York, 1964) and can be obtained from the corresponding known diphenols (II)

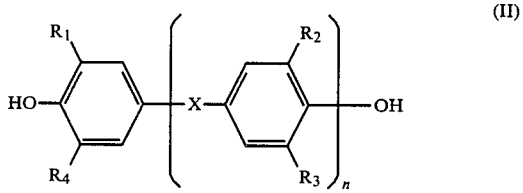

by known processes with the concomitant use of chain stoppers. The preferred method is the two-phase boundary method.

Particularly preferred diphenols are 4,4'-dihydroxybiphenyl, 2,2-bis(4-hydroxyphenyl)propane, 2,4-bis(4-hydroxyphenyl)-2-methylbutane, 1,1-bis(4-hydroxyphenyl)cyclohexane,α, α'-bis)4-hydroxyphenyl)-p-diisopropylbenzene, 2,2-bis)3-chloro-4-hydroxyphenyl)propane, α,α'-bis(3,5-dichloro-4-hydroxyphenyl)propane and 2,2-bis(3,5-dibromo-4-hydroxyphenyl)propane.

Preferred aromatic polycarbonates are those based on one or more of the diphenols mentioned as preferred. Particular preference is given to copolycarbonates based on 2,2-bis(4-hydroxyphenyl)propane and one of the other diphenols mentioned as particularly preferred, or honopolycarbonates of 2,2-bis(4-hydroxphenyl)propane.

The aromatic polycarbonates can be branched in a known manner by the incorporation of small quantities, preferably quantities of between 0.05 and 2.0 mol % (based on the diphenols used), of trifunctional or more than trifunctional compounds, for example those with three or more than three phenolic hydroxyl groups.

The aromatic polycarbonates should as a rule have mean weight-average molecular weights $\overline{M}_w$ of 10,000 to over 200,000, preferably of 20,000 to 80,000 (determined by measurement of the relative viscosity in $CH_2Cl_2$ at 25° C. and at a concentration of 0.5% by weight).

In principle, graft polymers as defined under component B in terms of the invention are known graft polymers of ethylenically unsaturated monomers grafted onto rubbers from the group consisting of diene monomer rubbers, alkyl acrylate rubbers and EPDM rubbers.

Graft polyers B in terms of the invention are in particular those in which a monomer mixture of 95 to 50% by weight of styrene, α-methylstyrene, methyl methacrylate or mixtures thereof and 5 to 50% by weight of acrylonitrile, methyl methacrylate or mixtures thereof is grafted onto one of the previously mentioned rubbers.

Examples of suitable rubbers are polybutadiene, butadiene/styrene copolymers with up to 30% by weight of internal styrene, butadiene/acrylonitrile copolymers with up to 20% by weight of acrylonitrile, or copolymers of butadiene with up to 20% by weight of a lower alkyl ester of acrylic or methacrylic acid, for example methyl acrylate, ethyl acrylate, methyl methacrylate or ethyl methacrylate. Examples of other suitable rubbers are polyisoprene or polychloroprene. Alkyl acrylate rubbers based on $C_1$-$C_8$-alkyl esters of acrylic acid, for example ethyl, butyl and/or ethylhexyl acrylate, are also suitable. These alkyl acrylate rubbers can optionally contain up to 30% by weight of copolymerized monomers such as vinyl acetate, acrylonitrile, styrene, methyl methacrylate or vinyl ether. Without exception, these alkyl acrylate rubbers also contain smaller quantities, for example up to 5% by weight, of ethylenically unsaturated monomers having a crosslinking action. Examples of such crosslinking agents are alkylenediol di(meth)acrylates, polyester di(meth)acrylates, divinylbenzene and trivinylbenzene, triallyl cyanurate and allyl (meth)acrylate. Alkyl acrylate rubbers of these types are known from the literature. Examples of other suitable rubbers are EPDM rubbers, i.e. rubbers of ethylene, propylene and an unconjugated diene monomer.

The rubbers suitable according to the invention for the preparation of the graft polymers of component B have a particulate structure with particle sizes ($d_{50}$values) of 0.08 μm to 5 μm, especially of 0.1 μm to 1 μm; moreover, they are present at least in a partially crosslinked from in the graft polymers (B). Particularly preferred rubbers are diene monomer rubbers or alkyl acrylate rubbers.

The graft copolymers as defined under component B consist of 5 to 80% by weight, in particular 20 to 70% by weight, of rubber and 95 to 20% by weight, in particular 80 to 30% by weight, of grafted monomers. Such graft copolymers are prepared by known free-radical graft copolymerization of the abovementioned monomers in the presence of the rubbers to be grafted. Preferred grafting processes are graft polymerization in emulsion, solution, bulk or suspension.

Acrylate rubbers suitable as a grafting base for the preparation of the graft polymer component B can also be products which contain, as the core, a crosslinked diene rubber of one or more conjugated dienes such as polybutadiene, or a copolymer of a conjugated diene with an ethylenically unsaturated monomer such as styrene and/or acrylonitrile.

Graft polymers B in terms of the invention are those prepared by the polymerization of monomers in the presence of a rubber. Such graft polymers usually consist of grafted rubber and ungrafted polymerized monomer. The true content of grafted rubber and ungrafted polymerized monomer in component B can be given by the known parameters such as degree of grafting or grafting yield. Such grafting yields can vary within wide ranges due to the conditions of graft polymerization.

Thus, without exception, graft polymers B in terms of the invention are mixtures of grafted rubber and copolymer of the monomers intended for grafting.

Examples of unsaturated epoxide compounds suitable for the preparation of the components C which are to be used according to the invention, and which are known in principle, are glycidyl (meth)acrylate, allyl glycidyl ether and propenyl glycidyl ether, but especially glycidyl (meth)acrylate.

Preferred copolymers C are copolymers of styrene, acrylonitrile and glycidyl (meth)acrylate; α-methylstyrene, acrylonitrile and glycidyl (meth)acrylate; α-methylstyrene, styrene, acrylonitrile and glycidyl methacrylate; styrene, methyl methacrylate and glycidyl methacrylate; styrene, acrylonitrile, methyl methacrylate and glycidyl methacrylate; styrene, maleic anhydride and glycidyl methacrylate; and styrene, acrylonitrile, maleic anhydride and glycidyl methacrylate.

The thermoplastic copolymers containing epoxide groups as defined under conponent C have mean molecular weights $\overline{M}_w$ (weight-average) above 30,000, in particular of 50,000 to 200,000, $\overline{M}_w$ being determined by light scattering or sedimentation.

The copolymers containing epoxide groups as defined under component C are prepared, for example, by known solution polymerization in organic hydrocarbons, it being necessary to observe conditions such that hydrolysis of the epoxide group is avoided. Examples of suitable conditions are: low contents of polar solvents such as water, alcohol, acids or bases, and performing the polymerization in solvents from the group consisting of organic hydrocarbons which are inert to epoxide groups, such as, for example, toluene, ethylbenzene, xylene, high-boiling aliphatics, esters or ethers.

The copolymers containing epoxide groups which are as defined under component C can be prepared by bulk polymerization, it being necessary to observe the following conditions approximately: performing the polymerization with thermal or free-radical initiation at temperatures of 40° C. to ° C., in particular 80° to 130° C., especially as a continuous process and with partial monomer conversion, so that the resulting polymer is obtained as a solution in the monomer system.

The following are examples of suitable monomers for the suitable, known, epoxide-free thermoplastic copolymers mixed with the epoxide-containing copolymer: styrene, α-methylstyrene, acrylonitrile, methyl methacrylate, a halogenostyrene, p-methylstyrene, maleic anhydride, N-substituted maleimides and small quantities of up to 10% by weight of monomers such as butyl acrylate, vinyl ether or vinyl acetate.

Preferred epoxide-free copolymers as defined under component C are styrene/acrylonitrile copolymers and α-methylstyrene/acrylonitrile copolymers.

The molecular weights of the epoxide-free copolymers, $\overline{M}_w$ (weight-average molecular weight), should be between 30,000 and 200,000, determined by light scattering or sedimentaion.

Preferred moulding compositions according to the invention contain epoxide-free thermoplastic copolymers in combination with epoxide-containing thermoplastic copolymers; in particular, the type of epoxide-free monomer units should be identical in both components.

The epoxide-free copolymers are prepared in a known manner by polymerization in solution, bulk, emulsion, under precipitation or in dispersion, but in particular by polymerization in solution, bulk or emulsion.

The at least partially crosslinked butadiene/acrylonitrile copolymer rubbers as defined under component D are known polymeric compounds in which the weight ratio of acrylinitrile to butadiene is from 15:85 to 35:65, preferably from 20:80 to 30:70. The copolymeric rubbers can also optionally contain other internal unsaturated monomers such as, for example, alkyl (meth)acrylates, styrene or vinyl ethyl ether, in subordinate quantities.

The butadiene/acrylonitrile copolymer rubbers D are crosslinked in a known manner, as already described for the graft polymers B. The rubbers D have particulate structure and gel contents at room temperature of at least 20% by weight, preferably of at least 40% by weight, based on the weight of the copolymeric rubber D.

The copolymeric rubbers are prepared in a known manner, preferably by free-radical emulsion polymerization. Partial crosslinking means that, in this case, the gel content of the rubbers should be greater than 20% by weight, in particular greater than 40% by weight.

Examples of suitable organic halogen compounds are hexachlorocyclopentadiene, hexabromobiphenyl, octabromobiphenyl, tribromophenoxymethane, decabromobiphenyl, decabromodiphenyl ether, octabromodiphenyl ether, bis(2,4,-6-tribromophenyl) carbonate, tetrabromophthalmide, hexabromobutene, trichlorotetrabromotoluene, pentabromophenyl triphosphate, hexabromocyclododecane and oligomeric and polymeric ring-brominated polyphenylene oxides.

The active quantity thereof which is necessary for the flame-resistant treatment of the moulding compositions according to the invention depends primarily on the halogen content of the compounds and also on the type of halogen, i.e. bromine or chlorine; in the moulding compositions according to the invention which consist of A, B, C, including the halogen compound, and if appropriate D, there should be a halogen content of between 0.5% by weight and 8% by weight, based in each case on the total weight of the moulding composition according to the invention which consists of components A+B+C, including the halogen compound, and if appropriate D. This halogen content can also be introduced by means of known halogen substitution, which imparts flame resistance, in components A, B, C and/or D of the moulding composition according to the invention.

The antimony oxide flame retardant $Sb_2O_3$ can be used in quantities of between 0.5% by weight and 5% by weight, based on the total weight of components A+B+C+$Sb_2O_3$ and if appropriate component D and if appropriate the halogen compound, and is preferably used in combination with the halogen treatment of the moulding composition according to the invention.

The quantities to be used, if appropriate, of the other additives mentioned are familiar in the chemistry of polycarbonate/graft polymer mixtures.

The moulding compositions according to the invention can be prepared by melt compounding of the individual components at temperatures of 200° to 280° C., preferably 230° to 250° C., in conventional machine units such as kneaders or extruders.

The moulding compositions of the present invention can be used to produce all types of mouldings. In particular, it is possible to produce mouldings by injection moulding. Example of mouldings which can be produced are: all types of case parts (for example for household appliances such as juice extractors, coffee makers and mixers) or covering boards for the building industry and parts for the car industry. They are also used in the field of electrical engineering because they are distinguished by very good electrical properties.

EXAMPLES

Polymers and additives used

A.1

Aromatic polycarbonate of 2,2-bis(4-hydroxyphenyl)propane (bisphenol 1-A), with a relative viscosity of 1.26, measured in $CH_2Cl_2$ at 25° C. (0.5% by weight solution).

A.2

Aromatic polycarbonate of 10% by weight of 2,2-bis(4-hydroxy-3,5-dibromophenyl)propane (tetrabromobisphenol-A) and 90% by weight of bisphenol-A, with a relative viscosity of 1.284, measured in $CH_2Cl_2$ at 25° C. (0.5% by weight solution).

B.

Graft polymer prepared by grafting 35 parts by weight of styrene and 15 parts by weight of acrylonitrile onto 50 parts by weight of a coarsely particulate polybutadiene (prepared via emulsion polymerization according to the information in German Auslegeschriften Nos. 1,247,665 and 1,269,360), the average particle diameter of the polybutadiene grafting base present in latex form being between 0.3 and 0.4 μm (this particle size information and corresponding information in the text represent average particle diameters ($d_{50}$) and are determined by ultracentrifugation measurements; cf. W. Scholtan et al., Colloids Z. Polymere, 250 (1972), pages 783-796).

C.1

Styrene/acrylonitrile copolymer with a styrene/acrylonitrite ratio of 72:28 and a limiting viscosity of $[\eta]=0.70$ dl/g (measurement indimethylformamide at 20° C.).

C.2

A styrene/acrylonitrile/glycidyl methacrylate terpolymer containing 29% by weight of internal acrylonitrile and 1.5% by weight of internal glycidyl methacrylate is obtained by terpolymerizing a mixture of 0.7 part by weight of glycidyl methacrylate, 44.8 parts by weight of styrene, 24,5 parts by weight of acrylonitrile, 30 parts by weight of ethylbenzene, 0.35 part by weight of dimeric α-methylstyrene and 1.1% by weight of azoisobutyronitrile (based on 10,000 parts by weight of monomer mixture) at 130° C. until the solution has a solids content of 35%. The solvent is stripped off to give a resinous polymer with a Staudinger index of 0.69 dl/g (measured in DMF at 20 ° C.).

C.3

A styrene/acrylonitrile/glycidyl methacrylate terpolymer containing 28% by weight of internal acrylonitrile and 2.4% by weight of internal glycidyl methacrylate is obtained analogously to the instructions in C.2, a mixture of 1.2 parts by weight of glycidyl methacrylate, 44.3 parts by weight of styrene, 24.5 parts by weight of acrylonitrile, 30 parts by weight of ethylbenzene and 0.35 part by weight of dimeric α-methylstyrene being used for polymerization. The resulting resin has an $[\eta]$ value of 0.72 dl/g, determined as in C.2.

D.

Butadiene/acrylonitrile copolymer rubber containing 29% by weight of acrylonitrile, prepared via aqueous emulsion polymerization with partial crosslinking of the emulsified rubber particles. The particle size of the rubber latex is 0.12 μm ($d_{50}$ value). The rubber has a gel content of 88% by weight. After the emulsion polymerization is complete, the rubber is coagulated with electrolyte and dried. Preparation of the moulding compositions: Compounding of the individual components via a ZSK 53 double-shaft extruder from Werner and Pfleiderer. In this process, the products were mixed at a mass temperature of 242°C., a speed of 60 rpm and a throughput of 24 kg/hour and then granulated.

The test-pieces required for the individual tests were produced with an injection moulding machine at 260° C. (unless stated otherwise). Tests performed:

The heat distortion resistance by the Vicat (B) method was determined according to DIN 53460/ISO 360.

The surface condition was determined visually on injection mouldings (standard rod or sample boards of dimensions 60×40×2 mm) produced at an injection temperature of 260° C.

The notched impact strength was determined on the basis of DIN 53452 (ISO R 179 on flat rods (90 mm×10 mm ×4 mm) with a V-notch of depth 2.7 mm. Determination of the limiting heat stability:

The material to be tested was dried for 2 to 3 hours at 110° C. in a Turbeture and then injection-moulded to form sample boards of dimensions 60×40×2 mm. The machine unit used was a Monomat 25, the processing conditions being as follows:

Screw speed—100/minute,
Injection speed—2.5 seconds,
Holding pressure—60 bar,
Dwell time of the material in the
machine unit—6.5 minutes.

The mass temperature was raised from 220° C. to 300° C. in 10° C. intervals. At each temperature, 10 sample boards were produced and visually assessed for their surface condition. The limiting heat stability is taken as the temperature at which the first surface imperfections (for example waviness) were found.

| Examples | | | | | | | | | | | |
|---|---|---|---|---|---|---|---|---|---|---|---|
| Composition | | | | | | | | | | | |
| Polycarbonate A 1 | Parts by wt. | 60[1] | 60 | 60 | 60 | 65[1] | 65 | 55.8[1] | 55.8 | — | — |
| Polycarbonate A 2 | " | — | — | — | — | — | — | — | — | 70[1] | 70 |
| Graft polymer B | " | 24 | 24 | 24 | 24 | 17.5 | 17.5 | 22.3 | 22.3 | 11.2 | 11.2 |
| Polymer C 1 | " | 16 | | | 6 | 11.5 | | 14.9 | | 16.8 | |
| Polymer C 2 | " | | 16 | | | | | | 14.9 | | 16.8 |
| Polymer C 3 | " | | | 16 | 10 | | 11.5 | | | | |
| Copolymeric rubber D | " | | | | | 6.0 | 6.0 | | | | |
| TiO2 | " | | | | | | | 7.0 | 7.0 | | |

-continued

| Examples | | | | | | | | | | |
|---|---|---|---|---|---|---|---|---|---|---|
| $Sb_2O_3$ (Stibiox MS) | " | | | | | | | | 2.0 | 2.0 |
| Properties | | | | | | | | | | |
| Vicat B, °C. | 122 | 126 | 123 | 125 | 123 | 125 | 122 | 125 | 137 | 143 |
| Surface | glossy | matt | matt | matt | slightly matt | matt | glossy | matt | glossy | matt |
| Limiting heat stability, °C. | 260 | 290 | 280 | 280 | 290 | 300 | 260 | 290 | 260 | 300 |
| Notched impact strength, kJ/m² | 28 | 36 | 17 | 19 | 49 | 40 | 38 | 18 | 18 | 12 |

[1]Comparative examples

We claim:

1. A thermoplastic moulding composition containing:
   (A) 10 to 80 parts by weight of an aromatic thermoplastic polycarbonate,
   (B) 10 to 60 parts by weight of a graft polymer of ethylenically unsaturated monomers grafted onto a rubber, with a rubber content of 5 to 80% by weight, based on the weight of component (B),
   (C) 10 to 60 parts by weight of one or more thermoplastic, resinous, high-molecular rubber-free copolymers,
   the sum of A+B+C being 100 parts by weight in each case, and
   (D) 1 to 20 parts b weight, based in each case on the sum of A+B+C+D, which is again 100 parts by weight in each case, of an at least partially cross-linked, internal butadiene/acrylonitrile copolymer rubber in which the weight ratio of acrylonitrile to butadiene is from 15:85 to 35:65 and which has a particle size of 0.05 μm to 0.3 μm, in which the polymer or one of the polymers of component C contains 0.05 to 5% by weight, based on the total weight of component C, of an ethylenically unsaturated, copolymerized epoxide compound.

2. A moulding composition according to claim 1, in which the polymer or one of the polymers of component C contains 0.1 to 3% by weight of the copolymerised epoxide compound, based on the total weight of component C.

3. A moulding composition according to claim 1, in which component C comprises at least one terpolymer of
   (i) styrene, α-methylstyrene, a halogenostyrene, a ring-substituted $C_1$-$C_5$-alkylstyrene, methyl methacrylate or a mixture thereof with
   (ii) (meth)acrylonitrile, maleic anhydride or mixture thereof and with
   (iii) the ethylenically unsaturated epoxide compound, in which the weight ratio of the monomers of (ii) to those of (ii) is between 90:10 and 50:50.

4. A moulding composition according to claim 3, in which the weight ratio of the monomers of (i) to those of (ii) is between 80.20 and 65:35.

5. A moulding composition according to claim 1, in which the ethylenically unsaturated, copolymerised epoxide compound in component C is glycidyl (meth)acrylate.

6. A moulding composition according to claim 1, in which the copolymer rubber of component D is present in an amount of 5 to 20 parts by weight, based on the sum of A+B+C+D as 100 parts by weight.

7. A moulding composition according to claim 1, in which the copolymer rubber of component D has a weight ratio of acrylonitrile to butadiene of from 20:80 to 30: 70 and a particle size of 0.08 μm to 0.2 μm.

8. A moulding composition according to claim 1 having a halogen content of 0.5% by weight to 8% by weight, based in each case on the total weight of the moulding composition according to the invention which consists of components A+B+C, including the halogen compound, and component D.

9. A moulding composition according to claim 8 which additionally contains 0.5 to 5% by weight of $Sb_2O_3$, based on the total weight of components A+B+C +$Sb_2O_3$ and halogen compound, and component D.

10. A moulding composition according to claim 1, additionally containing one or more extra components pigments, lubricants antistatic agents, plasticizers, dyestuffs or fillers.

* * * * *